May 31, 1927.
R. LEE
SPEED GOVERNOR FOR ELECTRIC MOTORS
Filed Sept. 26, 1923
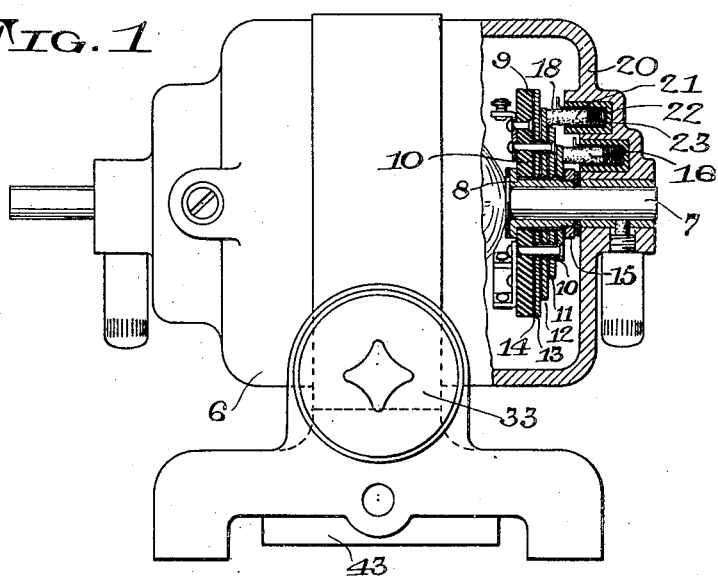
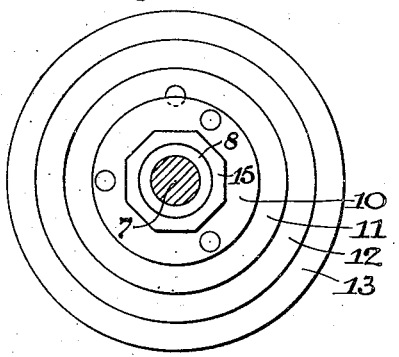
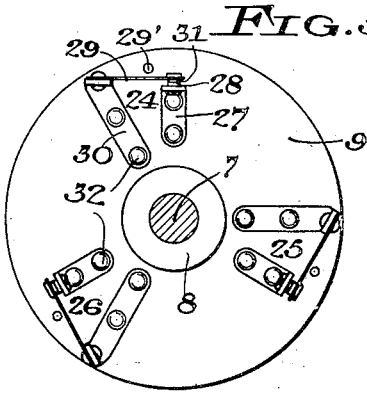
WITNESSES
INVENTOR
Royal Lee
ATTORNEY Patented May 31, 1927.

1,630,394

UNITED STATES PATENT OFFICE.

ROYAL LEE, OF MILWAUKEE, WISCONSIN.

SPEED GOVERNOR FOR ELECTRIC MOTORS.

Application filed September 26, 1923. Serial No. 664,926.

The invention relates to speed controllers for electric motors. One of the objects of the invention is to provide a speed controller for electric motors of the automatic breaker type that is simple in construction and efficient in operation.

A further object of the invention is to provide a speed controller for electric motors of the automatic breaker type in which a plurality of speeds are under the control of the operator through the operation of a switch.

A further object of the invention is to provide a speed control for motors of the series or universal type, which will permit the production of substantially increased power over that usually obtained in a motor of similar physical dimensions, and which will effect economies in the cost of producing the motor windings.

A further object of the invention is to provide a breaker mechanism in which the lives of the contact points are greatly prolonged over the usual construction.

The invention further consists in the several features hereinafter set forth and more particularly defined by claims at the conclusion hereof.

In the drawings: Fig. 1 is a side elevation of a motor equipped with a speed controller embodying the invention, parts being broken away and parts being shown in vertical section; Fig. 2 is a front end view showing the collector disks of the device; Fig. 3 is a rear end view of the controller showing the circuit breakers; Fig. 4 is a schematic wiring diagram where the motor is using direct current; Fig. 5 is a schematic wiring diagram where the motor is using alternating current; and Fig. 6 is a detail view of a contact member.

In the drawings the numeral 6 designates a motor of any suitable design and 7 the motor shaft. The motor is preferably of the series or universal type, which is intended for operation at times under no-load conditions.

A flanged collar 8 is mounted on the motor shaft and carries a disk 9 of insulating material and concentric disks 10, 11, 12 and 13, each separated from the adjacent disks by suitable insulation such as a thin layer or sheet 14 of mica or other suitable material, said disks being clamped between the flange on said collar and a nut 15. The disks 10, 11, 12 and 13 are of different areas and arranged in step formation from the smallest disk 10 to the largest disk 13, thereby providing a track or pathway on each disk for a brush. There are four brushes, 16, 17, 18 and 19, each brush cooperating with one of the four disks and each suitably mounted in the frame or casing 20 of the motor. In Fig. 1 I have shown the brushes 16 and 18 in detail, each brush assembly including a carbon brush 21 slidably mounted in a metal cup 22 and held against the disk with which it cooperates by a spring 23.

As shown, the controller is adapted to regulate the speed of the motor for three different speeds and for this purpose three automatic circuit breaker mechanisms, 24, 25 and 26 are provided. Each of these mechanisms includes a terminal connector 27 and a relatively fixed contact 28 secured thereto, and a movable contact member 29 in the form of a flat spring secured at one end to a terminal member 30 and having a contact point 31 adapted to cooperate with the contact 28 and limited in its movement by a pin or stop 29'. The springs or members 29 are adopted under the action of centrifugal force to swing out and separate the contacts at the time the desired speed of the motor has been attained, and these springs are of varying strength so that the breaker 24 may control the low speed, the breaker 25 the intermediate speed and the breaker 26 the high speed of the motor.

In order to effect these controls, each of the members 30 is connected to the disk 10 by a rivet 32 suitably insulated or spaced from the other metal disks, and the connectors 27 are each independently connected with another one of the metal disks as for instance the connector 27 for breaker 24 is connected to the disk 11, the connector 27 for breaker 25 is connected to the disk 12, and the connector 27 for breaker 26 is connected to the disk 13.

The change of speeds is under the control of the operator through the operation of a four-way switch 33, said switch having three operative or circuit-closing positions and a neutral position. A conductor 34 connects brush 17 with switch contact 35, a conductor 36 connects brush 18 with switch contact 36' and a conductor 37 connects brush 19 with switch contact 38. One line 39 of the current supply circuit leads to the pivoted switch arm 40 while the other line 41 of the supply circuit leads from the motor. A conductor 42 connects the brush 16 with the field of the motor. In Fig. 4 where the motor is used on direct current, I place a condenser 43 across the line; that is, across the conductors 39 and 42, whereby sparking and consequent rapid deterioration of the contact points 28 and 31 of the breakers is prevented.

In Fig. 5, where the motor is used on alternating current and is using considerable current, I prefer to place a vacuum gap tube 44 across the line; that is, across the conductors 39 and 42, to prevent possible sparking and deterioration of the contact points of the breakers.

To further prolong the lives of the contact points, each of the breaker mechanisms may have a spring arm 45 carrying two contact points 46 which are adapted to cooperate with similarly positioned fixed contact points carried by the terminal member 27. By this arrangement the wear is greatly decreased as the sparking effect is proportional to the square of the current, and by conducting the current across two paths there is one quarter as much arcing produced as with a single set of contacts.

With the construction above described it will be noted that any one of the breaker mechanisms may be put in circuit with the motor and that these mechanisms will cause the motor to run at different predetermined speeds, as the springs 29 are of different strengths so that different centrifugal forces are necessary to actuate each breaker mechanism. As previously explained, the spring for the breaker 24 will be moved by centrifugal force to open the circuit when the motor has reached a certain predetermined speed and will consequently keep the motor running at "low speed" when switch arm 40 is in contact with contact 35. Similarly the spring for breaker 25 will be moved by centrifugal force to open the circuit when necessary so as to keep the motor running at "intermediate speed" when the switch arm 40 is in contact with contact 36'. Similarly the spring for breaker 26 will be moved by centrifugal force to keep the motor running at "high speed" when the switch arm 40 is in contact with contact 37. When switch arm 40 is on a contact 47 no current will flow to the motor.

When the switch arm is moved into contact with any one of the live contacts 35, or 36', or 37, it will be noted that current passes from the line 39 to one of the brushes 17, or 18, or 19 by way of one of the conductors 34, or 36, or 37, and that said brushes conduct the current to one of the disks 11, or 12, or 13, and that from one of these disks the current passes through the breaker 24, or 25, or 26 to the disk 10 and then through brush 16 to the conductor 42.

From the foregoing description it will be noted that I have provided a speed controller for an electric motor permitting the operator to run the motor at one of a plurality of predetermined speeds, and to automatically maintain the speed of the motor substantially constant at the selected speed.

It is well known that in motors of the series or universal type that comparatively high resistance windings are employed in order to limit the speed of the motor and prevent the armature from running away to destruction when under no-load conditions. By the use of the circuit breaker of this invention, comparatively inexpensive low resistance windings may be provided, since the speed of the motor is limited by the circuit breaker in the load circuit. This in turn leads to the production of substantially increased power over that usually obtained in a motor of ordinary construction having similar physical dimensions. The circuit breaker is set to limit the speed of the armature at a safe upper limit under no-load conditions and the speed does not drop when the load is imposed as in ordinary series motors but continues at the same value under normal loads, because the comparatively low resistance windings permit a larger current to flow. The higher speed and heavier current result in a substantial gain in power, with no appreciable increase in heat losses, and the cooling is also somewhat improved at the higher operating speed.

I desire it to be understood that this invention is not to be limited to any specific form or arrangement of parts except in so far as such limitations are specified in the claims.

What I claim as my invention is:

1. The combination with an electric motor, of a speed controller comprising centrifugally operated breaker mechanisms for automatically maintaining the speed of the motor at any one of a plurality of predetermined speeds, and means under the control of the operator for rendering effective the mechanism maintaining the speed desired.

2. The combination with an electric motor, of a plurality of centrifugally operated circuit breaker mechanisms adapted to open the motor circuit at predetermined speeds, and means including a switch under the control of the operator to select that breaker mechanism for operation which provides the desired speed.

3. The combination, with an electric motor, of a plurality of control circuits leading to the motor, a centrifugally operated speed control circuit breaker in each of said circuits, the breaker for one circuit being designed to operate at a different speed from those of the other circuits, a switch for directing the current through one of said circuits, and an arc-preventing device in circuit with all of said control circuits.

4. The combination with an electric motor, of a plurality of concentrically arranged disks mounted on the shaft of said motor, a supply line, conducting means including a brush for conducting current to each of said disks, a switch for selectively directing current from the line to any one of said conducting means, a circuit breaker in circuit with each of said disks and with the motor and rotating with said disks, each breaker including an arm centrifugally movable to break the circuit between the motor and its associated disk when a predetermined speed is exceeded.

5. The combination with an electric motor, of a disk mounted on the shaft of said motor, brackets carried on one side of said disk, a contact carried by one of said brackets, a contact spring carried by the other of said brackets and having a contact co-operating with said first-named contact to form a circuit breaker, collector rings carried on the other side of said disk and electrically connected to said brackets, and brushes for conducting current to said collector rings, said contacts being included in the load circuit and separating under the influence of centrifugal force for limiting the speed of the motor by controlling the mean value of load current.

6. The combination with an electric motor, of an insulating disk mounted on the shaft of said motor, brackets mounted on one side of said disk, collector rings mounted on the other side of said disk, attaching members passing through said disk for securing said brackets and collector rings thereto and for establishing an electrical connection between them, brushes for conducting current to said collector rings, a contact mounted on one of said brackets, and a spring mounted on the other of said brackets and having a contact co-operating with said first-named contact to form a circuit breaker, said contacts being included in the load circuit and separating under the influence of centrifugal force for limiting the speed of the motor by controlling the mean value of load current.

In testimony whereof, I affix my signature.

ROYAL LEE.